(12) United States Patent
Mochizuki

(10) Patent No.: US 7,185,727 B2
(45) Date of Patent: Mar. 6, 2007

(54) SEAT ASSEMBLY

(75) Inventor: Tetsumei Mochizuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 275 days.

(21) Appl. No.: 10/911,774

(22) Filed: Aug. 4, 2004

(65) Prior Publication Data
US 2005/0029019 A1 Feb. 10, 2005

(30) Foreign Application Priority Data
Aug. 5, 2003 (JP) ............... 2003-286683

(51) Int. Cl.
*B60R 21/16* (2006.01)
(52) U.S. Cl. .................. 180/273; 280/735; 280/801.1; 177/144
(58) Field of Classification Search ............... 177/144; 180/273; 280/735, 801.1
See application file for complete search history.

(56) References Cited

U.S. PATENT DOCUMENTS

| | | | | |
|---|---|---|---|---|
| 6,069,325 | A * | 5/2000 | Aoki ................... | 177/136 |
| 6,509,653 | B2 * | 1/2003 | Fujimoto et al. ........ | 307/10.1 |
| 6,561,300 | B1 * | 5/2003 | Sakamoto et al. ........ | 180/273 |
| 6,583,367 | B2 * | 6/2003 | Wolfe et al. ............. | 177/136 |
| 6,764,095 | B2 * | 7/2004 | Stephan et al. .......... | 280/735 |
| 6,808,201 | B2 * | 10/2004 | Aoki ................... | 280/735 |
| 6,824,167 | B2 | 11/2004 | Nishimoto et al. | |
| 6,871,159 | B2 * | 3/2005 | Hattori et al. ........... | 702/173 |
| 6,974,192 | B2 * | 12/2005 | Miwa et al. ............. | 297/473 |
| 2003/0168895 | A1 * | 9/2003 | Sakai et al. | |
| 2004/0041389 | A1 * | 3/2004 | Nishide et al. | |
| 2004/0145174 | A1 | 7/2004 | Fujii et al. | |
| 2004/0232690 | A1 | 11/2004 | Fuji et al. | |
| 2005/0029019 | A1 * | 2/2005 | Mochizuki | |

FOREIGN PATENT DOCUMENTS

| | | |
|---|---|---|
| JP | 11-94637 | 4/1999 |
| JP | 2003-237531 | 8/2003 |
| JP | 2003-252171 | 9/2003 |
| JP | 2005-088870 | 4/2005 |

* cited by examiner

*Primary Examiner*—Randy W. Gibson
(74) *Attorney, Agent, or Firm*—Rankin, Hill, Porter & Clark LLP (57) ABSTRACT

A vehicle seat for receiving an occupant is placed on a slider so as to move along a guide rail. A pair of belt anchor brackets for anchoring each end of a lap belt at each side of the seat is provided under the guide rail, and a weight sensor for sensing weight variation of the seat is provided under the belt anchor bracket. The tension of a seat belt (lap belt) does not affect the weight sensing functionality of the weight sensor and the state of the seat can accurately be determined.

14 Claims, 7 Drawing Sheets

SEAT ASSEMBLY

BACKGROUND OF THE INVENTION

This invention relates generally to seat assemblies, and more particularly to a vehicle seat assembly having the function of sensing and weighing an occupant seated on the seat of a vehicle.

Conventionally, an air bag system (hereinafter referred simply to "air bag") equipped inside a vehicle, typically mounted under the dashboard for front-seat passengers, or on the back of the front seat of the vehicle for rear-seat passengers, is controlled so that whether to actuate the air bag in a collision or the like and how rapidly to allow the air bag if actuated to inflate are determined in accordance with the status of the seat as represented by whether a given seat is occupied and how much an occupant if any weighs. For example, control is exercised such that if the seat is occupied by an adult or an adolescent (older child), the air bag is actuated, but if the seat is unoccupied or occupied by a baby (infant) or toddler secured in a child safety seat (child restraint), the air bag is not actuated; and when the air bag is actuated, if the seat is occupied by an adult or well-built adolescent, the air bag is actuated at a higher speed, but if the seat is occupied by a small child, the air bag is actuated at a lower speed. This allows an air bag to exercise an optimum restraint on an occupant to be protected in a collision or the like, according to the status of the seat for which the air bag is provided, and addresses the need for preventing an unnecessary deployment of an air bag corresponding to the unoccupied seat or the seat occupied by an infant or toddler occupying a child safety seat.

In order to exercise an adequate control over the operation of an air bag, seat assemblies having the function of sensing the weight of an occupant seated on the seat have been proposed. For example, one or more weight sensors is typically mounted in such a position under a seat as to move together with the seat as the seat slides in front/rear directions. Instead, disclosed in JP 11-94637 A is a seat occupant sensing system having a load cell (weight sensor) provided in a fixed position at a floor of the vehicle but the weight is measured from the shift amount of a bucket-shaped weight-receiving member that supports the seat, and the weight-receiving member thus appears to move together with the seat as the seat slides in front/rear directions.

Figure 8:
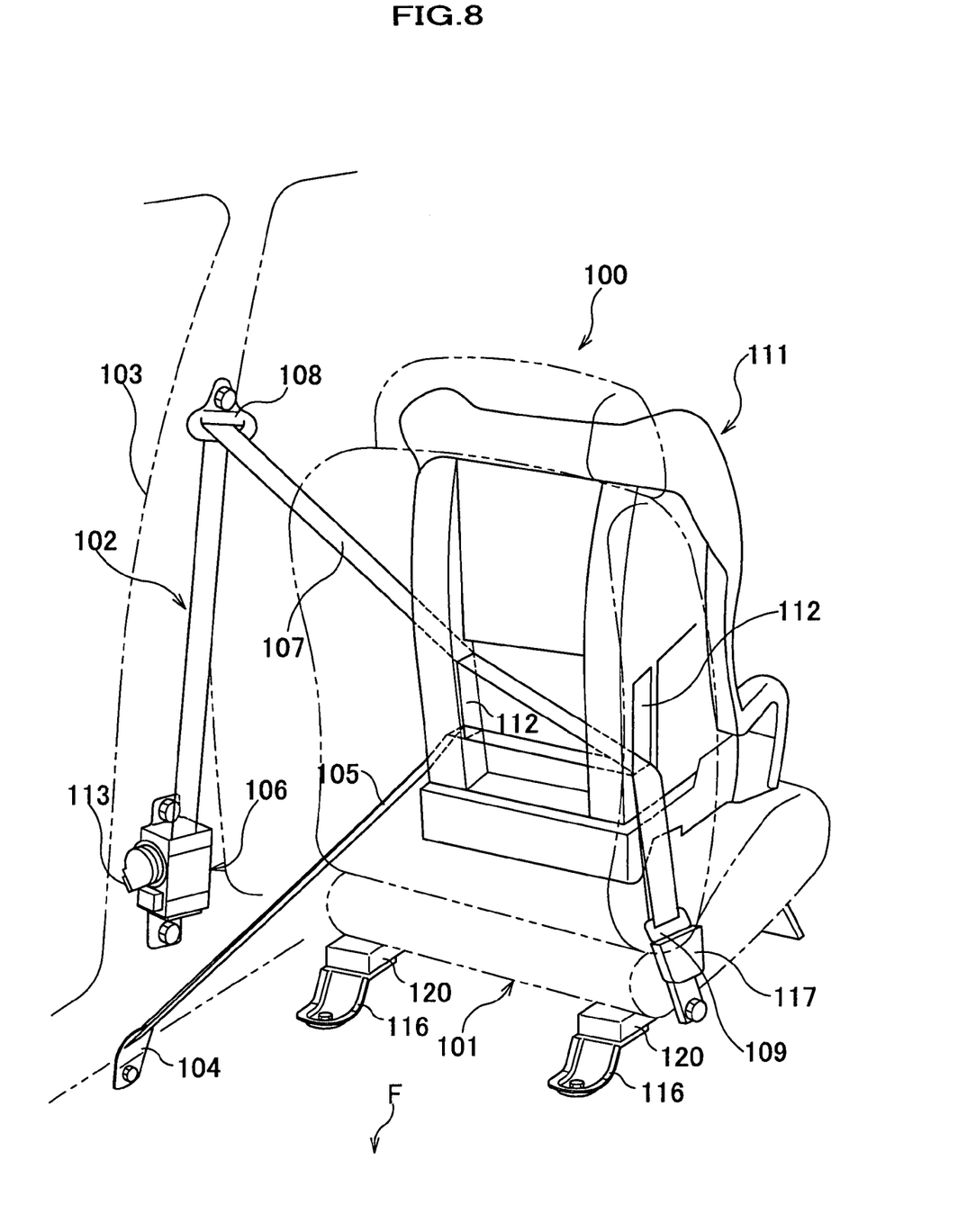
FIG. 8 is a conceptual illustration, in perspective, of a conventional seat assembly provided with a weight sensor, as viewed obliquely from a rear seat.
Figure 9:
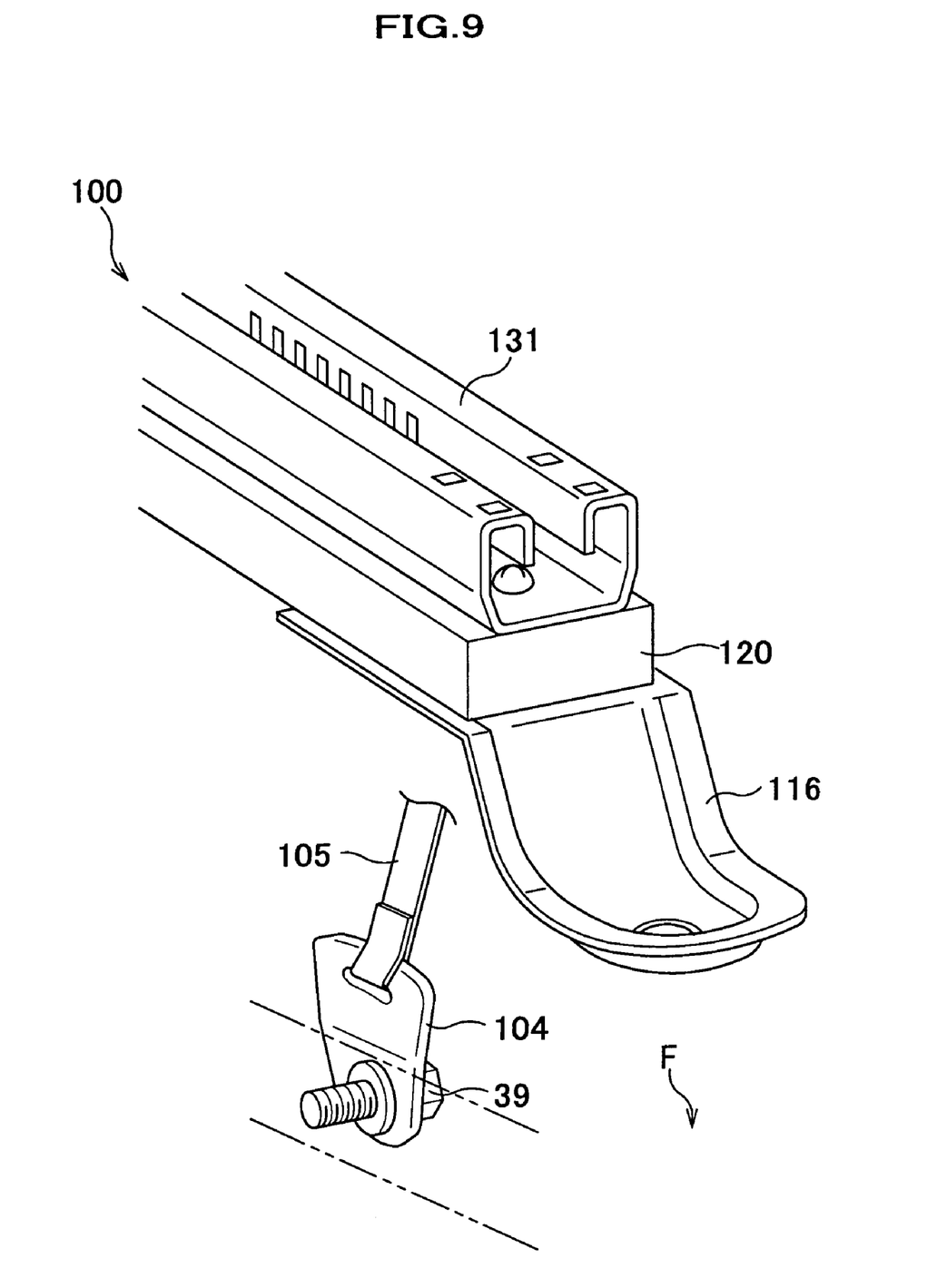
FIG. 9 is a perspective view showing a lower, left-hand side and rear portion of the conventional seat assembly of FIG. 8 with a weight sensor.

To be more specific, referring now to FIG. 8, which is a schematic illustration, in perspective, of an exemplary conventional seat assembly 100 as viewed obliquely from a rear seat, a passenger seat 101 (front seat) installed in a vehicle (placed on a floor F at the left side of its cabin) is occupied by a child safety seat 111, which is fastened by a seat belt device 102 using a belt insertion hole 112 provided in the child safety seat 111. The belt insertion hole 112 is a through hole perforated from side to side through the seat back of child safety seat 111. The seat belt device 102 for the seat 101 basically includes a seat belt anchor 104 provided on a widthwise outward edge of the floor F at the rear of the seat 101, a buckle 117 provided on a rear lower portion of a side of the seat 101 facing toward an inside of the vehicle, a slip guide 108 provided on an upper portion of a center pillar 103 of the vehicle, a retractor 106 provided on a lower portion of the center pillar 103, a seat belt, and a tongue 109 having a hole through which the seat belt is slidably threaded. The seat belt extends from the seat belt anchor 104, passing through the belt insertion hole 112 provided in the child safety seat 111, routed through the hole of the tongue 109 latched in the buckle 117, passing again through the belt insertion hole 112, and routed through a hole in the slip guide 108, and to the retractor 106 into which the seat belt may be retracted. Principal portion of the seat belt is comprised of a lap belt 105 extending between the seat belt anchor 104 and the tongue 109, and a shoulder belt 107 extending between the tongue 109 and the slip guide 108. A limit switch 113 provided in the retractor 106 serves to give a proper tension to the seat belt to facilitate handling thereof and to have an adequate restraint applied to an occupant. Since the seat belt anchor 104 is positioned at an adequately lower level and at the rearward of the seat 101 as shown in FIG. 8 (typically fastened with a bolt 39 on the floor F of the vehicle as shown in FIG. 9), the lap belt 105 of which one end is anchored to the seat belt anchor 104 and the other end is threaded through the hole of the tongue 109 to extend, as a shoulder belt 107, toward a slip guide 108 is configured to be held under a proper tension constantly giving an adequate downward and rearward stress for restraint of the occupant (or the child safety seat 111). As shown in FIG. 9, the seat assembly 100 also includes a guide rail 131 for guiding a front/rear movement of the seat 101. The guide rail 131 is provided under the seat 101 so as to receive a slider (not shown) fixed to the seat 101 for allowing the seat 101 to slide along the guide rail 131. In this construction, it might be conceptually conceivable, as illustrated in FIG. 9, (though it may appear impractical for reasons as will be described below) that a weight sensor 120 could be provided under the guide rail 131, and that a leg 116 could be provided under the weight sensor 120.

However, in this conceptual seat assembly 100, if the seat belt were buckled up to fasten to the seat 101 an occupant or a child safety seat with a child occupant seated therein, the tension of the lap belt 105 would press the seat cushion of the seat 101 toward the floor F of the vehicle, disadvantageously affecting the weight sensor 120, so that the weight sensor 120 would sense a load more than the weight of the occupant and generate a wrong signal as indicative of the status of the seat 101. Namely, it is understood that provision of the weight sensor 120 in the conventional seat assembly 100 in such a manner as discussed above should necessitate an extra mechanism for correcting the signal output from the weight sensor 120 on the basis of the action of the lap belt 105. Another disadvantage inherent in the above-discussed seat assembly 100 would be that, in cases where the seat assembly is applied to a two-door vehicle, when the seat 101 is slid frontward with its seat back tilted forward and/or its seat bottom tilted up to make a path for a person who wishes to get into the rear seat, the seat belt (especially, lap belt 105 laid across the path to the rear seat) obstructs the passage of the person, with the result that the person cannot easily get into or out of the rear seat.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a vehicle seat assembly that can fulfill the need to eliminate various disadvantages as described above; thus, the vehicle seat assembly consistent with the present invention may have a weight sensor actuated so as to accurately sense the weight of the seat occupant without suffering contamination by a tension of the seat belt, and may have a seat belt anchor attached in such a position as to prevent the seat belt fastened to the front seat from obstructing the passage of a person who wishes to get in or out of a rear seat of a two-door vehicle through a path made at the rear of the front seat by sliding the front seat frontward with its seat back tilted forward and/or its seat bottom tilted up.

According to another exemplary and more specific aspect of the present invention, there is provided a vehicle seat assembly provided with a weight sensor. The seat assembly includes, but not limited thereto: a seat for receiving an occupant; a guide rail for guiding a front/rear movement of the seat; a slider fixed to the seat, and placed on and slidably engaging with the guide rail; and a pair of belt anchor brackets for anchoring each end of a lap belt at each side of the seat, each provided under the guide rail. The weight sensor is configured to measure the weight of the above seat assembly to determine status of the seat.

The above belt anchor bracket may, preferably, but not necessarily, be held and fixed by and between the weight sensor and the guide rail.

In yet another exemplary aspect of the present invention, the belt anchor bracket may, preferably, but not necessarily, be fastened with at least one fastening pierced through the weight sensor, the belt anchor bracket and the guide rail, and may include, but not limited thereto, a projection projecting along at least one side of the guide rail. The above projection may, preferably, but not necessarily, be provided along a side of the guide rail facing a portion at which a belt anchor is attached. The projection may include, but not limited thereto, a plate that projects vertically from a horizontal face of the belt anchor bracket with a side edge thereof perpendicularly abutted with the side of the guide rail.

In yet another exemplary aspect of the present invention, the belt anchor may, preferably, but not necessarily, be fastened with at least one fastening pierced through the weight sensor, the belt anchor bracket and the guide rail, whereas the belt anchor bracket and the weight sensor each includes, but not limited to, a vertical plate portion at a rear end portion thereof, which vertical plate portions are placed to overlap each other, and fastened together with at least one fastening pierced therethrough.

In yet another exemplary aspect of the present invention, the belt anchor bracket may, preferably, but not necessarily, be fastened with at least one fastening pierced through the weight sensor, the belt anchor bracket and the guide rail, and may include, but not limited thereto, means for reinforcing the fastening between the belt anchor bracket and the guide rail against a pulling force of a lap belt, and/or means for preventing rotation of the belt anchor bracket due to the pulling force of the lap belt.

A seat assembly for a vehicle, according to still another exemplary aspect of the present invention, includes but not limited thereto: a seat for receiving an occupant; a guide rail for guiding a front/rear movement of the seat; a slider fixed to the seat, and placed on and slidably engaging with the guide rail; a pair of belt anchor brackets for anchoring each end of a lap belt at each side of the seat, each provided under the guide rail; a weight sensor provided under the belt anchor bracket, for sensing weight variation of the seat; and a leg for fixing the weight sensor to the vehicle.

The present invention can produce numerous advantageous effects.

According to the present invention, for example, a pair of the belt anchor brackets is provided within the assembly of which the weight is measured by the weight sensor, that is, the load-receiving member of the weight sensor is provided under the belt anchor brackets. Therefore, the tension of seat belt (lap belt) which pressurize the seat cushion toward the floor F (plus toward the rearward particularly in the event of a crash) of the vehicle does not affect the outputs of the weight sensor. Accordingly, the weight sensor can detect an accurate weight of the seat reflecting the status of the seat. Further, according to the present invention, since the seat belt anchor is attached in a fixed position relative to the guide rail, the seat belt (lap belt) fastened to the front seat never obstructs the passage of a person who wishes to get in or out of a rear seat of a two-door vehicle through a path made at the rear of the front seat by sliding the front seat frontward with its seat back tilted forward and/or its seat bottom tilted up.

Since the belt anchor bracket may be held and fixed by and between the weight sensor and the guide rail in one exemplary aspect of the present invention, the belt anchor bracket can be fastened securely to the seat assembly. In this structure, to more securely fix the belt anchor bracket to the seat assembly, various structural features as discussed above and means for preventing rotation of the belt anchor bracket due to the pulling force of the lap belt and/or means for reinforcing the fastening between the belt anchor bracket and the guide rail against the pulling force of the lap belt may be provided according to exemplary aspects of the present invention. Provision of a projection projecting along at least one side of the guide rail, for example, can serve to prevent undesirable rotation of the belt anchor bracket even when an abrupt tension takes place in the lap belt in a collision or the like. Provision of vertical plate portions at the rear end portion of the belt anchor bracket and the weight sensor and overlapped joint structure thereof as well as one or more fastenings pierced therethrough, for example, can serve to reinforce the joint portion of the belt anchor bracket.

BRIEF DESCRIPTION OF THE DRAWINGS

The above and other aspects, further features and advantages of the present invention will become readily apparent by describing in detail illustrative, non-limiting embodiments thereof with reference to the accompanying drawings, in which.

DETAILED DESCRIPTION OF THE EXEMPLARY EMBODIMENTS

A detailed description will be given hereinafter of exemplary embodiments of the present invention with reference to the accompanying drawings.

Figure 1:
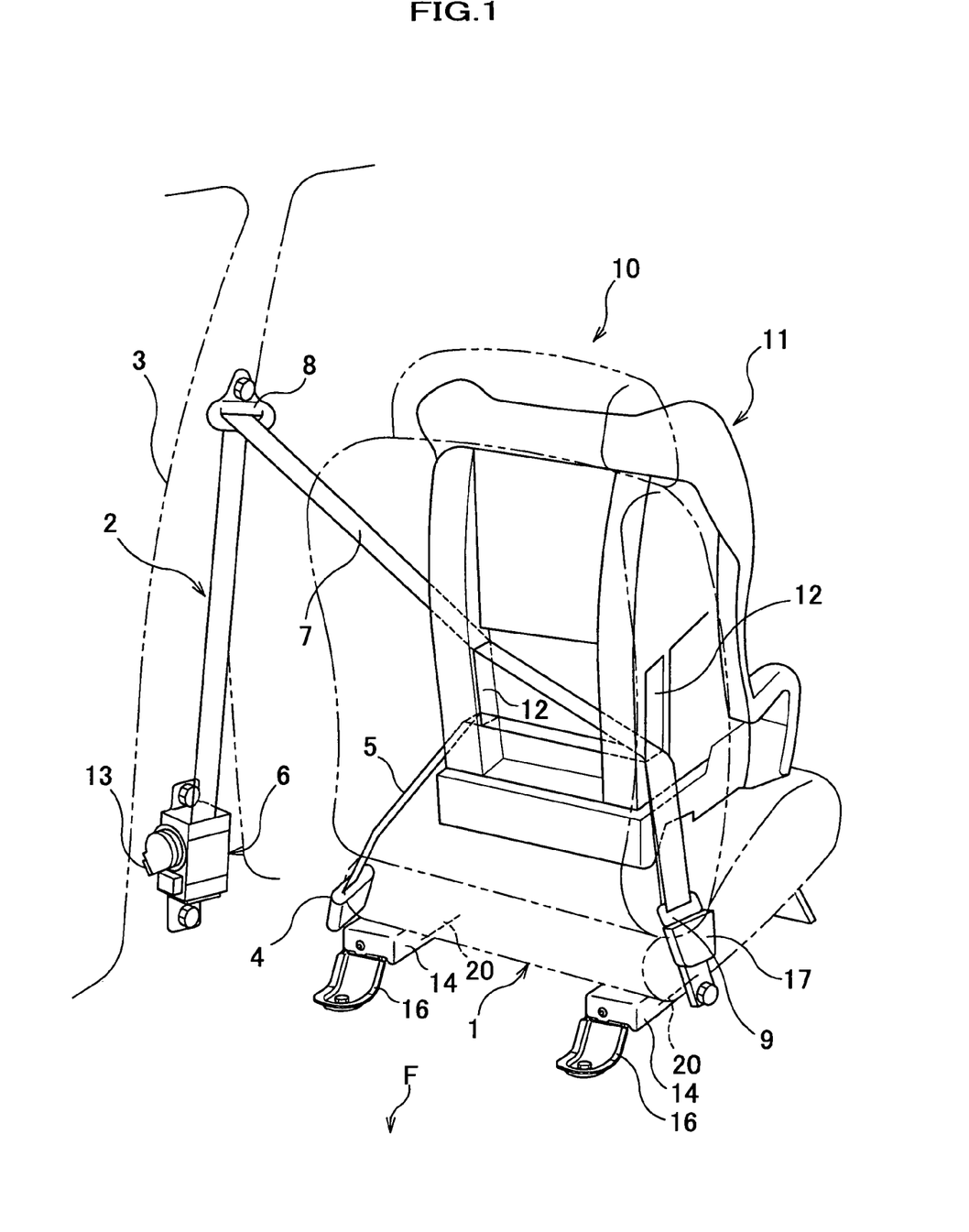
FIG. 1 is a perspective view of a seat assembly for a vehicle according to an exemplary embodiment of the present invention as viewed obliquely from a rear seat.

Referring now to FIG. 1, in a seat assembly 10, which is similar to the seat assembly 100 of FIG. 8 except for the position of a seat belt anchor 4 (cf. 104 of FIG. 8), belt anchor brackets 14 are provided on rear end portions of weight sensors 20 under a seat (front passenger seat) 1, and each seat belt anchor 4 is attached to one of the belt anchor brackets 14 provided at the outer (left) side of the seat 1. A lap belt 5 has one end thereof anchored to the seat belt anchor 4, and the other end thereof, as in the conventional seat assembly 100 shown in FIG. 8, threaded through the hole of a tongue 9 to extend as a shoulder belt 7 toward a slip guide 8 provided on an upper portion of a center pillar 3 of the vehicle. The tongue 9 is latched in a buckle 17, and the buckle 17 is attached to the other of the belt anchor brackets 14 provided at the inner (right) side of the seat 1 so that an adequate tension is provided to the lap belt 5. Each weight sensor 20 is provided under each belt anchor bracket 14, and legs 16 are provided under the weight sensors 20 to fix the weight sensors 20 to a floor F of the vehicle. A seat belt device 2 principally includes, but not limited thereto, a seat belt (comprised of the lap belt 5 and the shoulder belt 7), which are routed, starting at the seat belt anchor 4 positioned as described above, but otherwise as in the conventional seat belt device 102; i.e., the seat belt as lap belt 5 passes through a belt insertion hole 12 perforated through the seat back of a child safety seat 11, and is then threaded through the hole of the tongue 9 latched in a buckle 17, and the seat belt as shoulder belt 7 passes through the belt insertion hole 12 in the opposite direction, and is then routed through a hole of the slip guide 8, and to a retractor 6 provided on a lower portion of the center pillar 3. The retractor 6 is provided with a limit switch 13, and serves to regulate the retraction or retractive force applied to the seat belt. Since the seat 1 receives the child seat 11 instead of directly receiving an occupant and the seat belt device 2 fastens the child safety seat 11 in this exemplary and non-limiting embodiment, the retractive force given by the retractor 6 serves to secure the child safety seat 11 and thus the lap belt 5 allows the child safety seat 11 to give some stress downward to the seat bottom of the seat 1.

Figure 2:
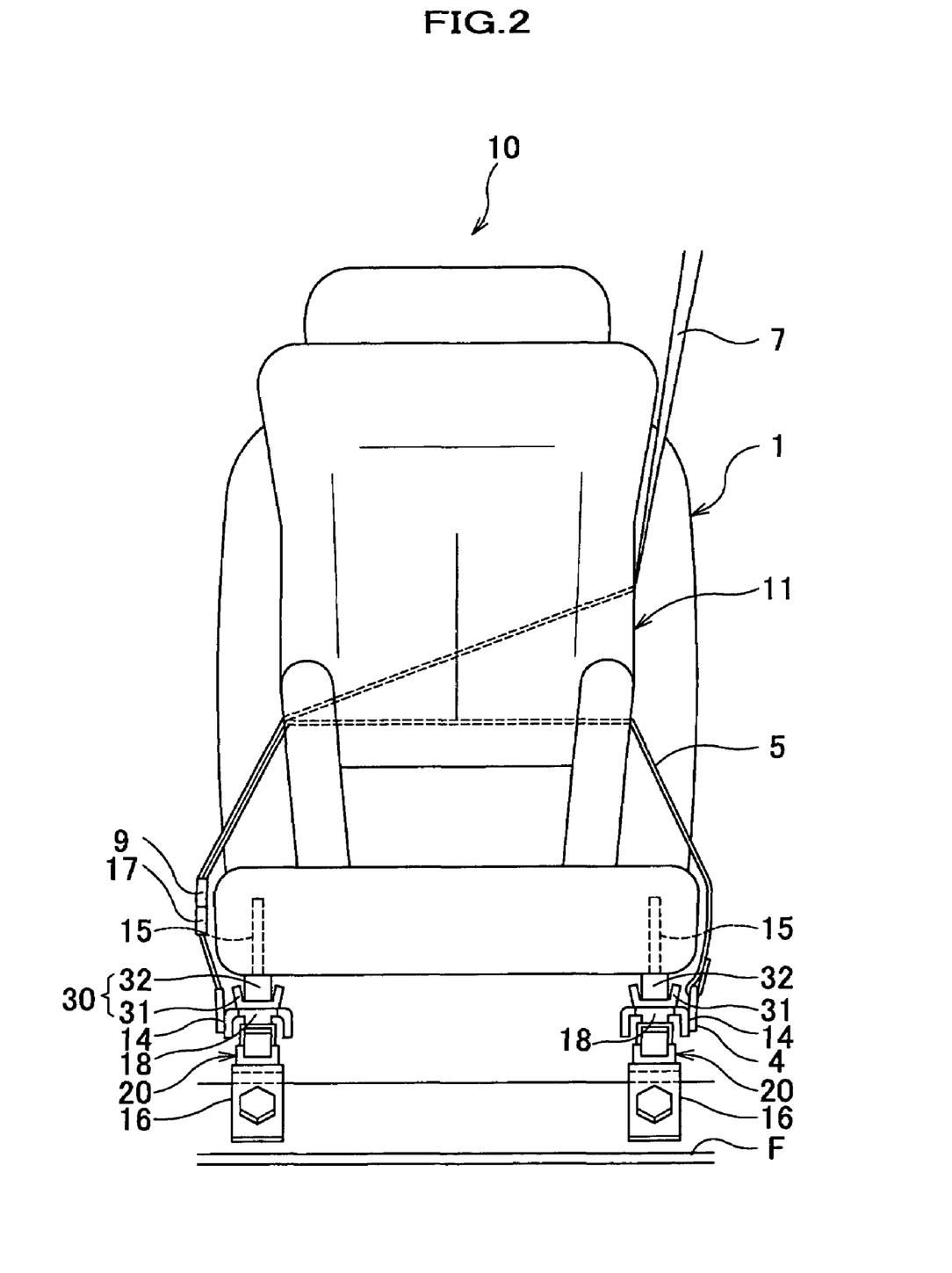
FIG. 2 is a front elevation of the seat assembly shown in FIG. 1.

Turning to FIG. 2, which shows a front elevation of the seat assembly 10 of FIG. 1 as viewed from the front of the vehicle, the weight sensors 20 are provided under the seat 1, one near the right side and the other near the left side of the seat bottom of the seat 1. The weight sensors 20 are placed and supported on the legs 16, which are in turn fixed on the floor F of the vehicle. Plates 15 making up a framework of the seat bottom of the seat 1 are provided along the both sides of the seat bottom of the seat 1. A slide rail 30 is constituted of a guide rail 31 (a pair of right and left rails corresponding to the right and left weight sensors 20) and a slider 32 (a pair of right and left rails corresponding to the rails of the pairwise guide rail 31). The slider 32 is fixed to the plates 15 embedded in the seat bottom of the seat 1. The guide rail 31 is supported with a front portion thereof placed on a front load-receiving member 18 and a rear portion thereof placed on the belt anchor brackets 14.

Figure 3:
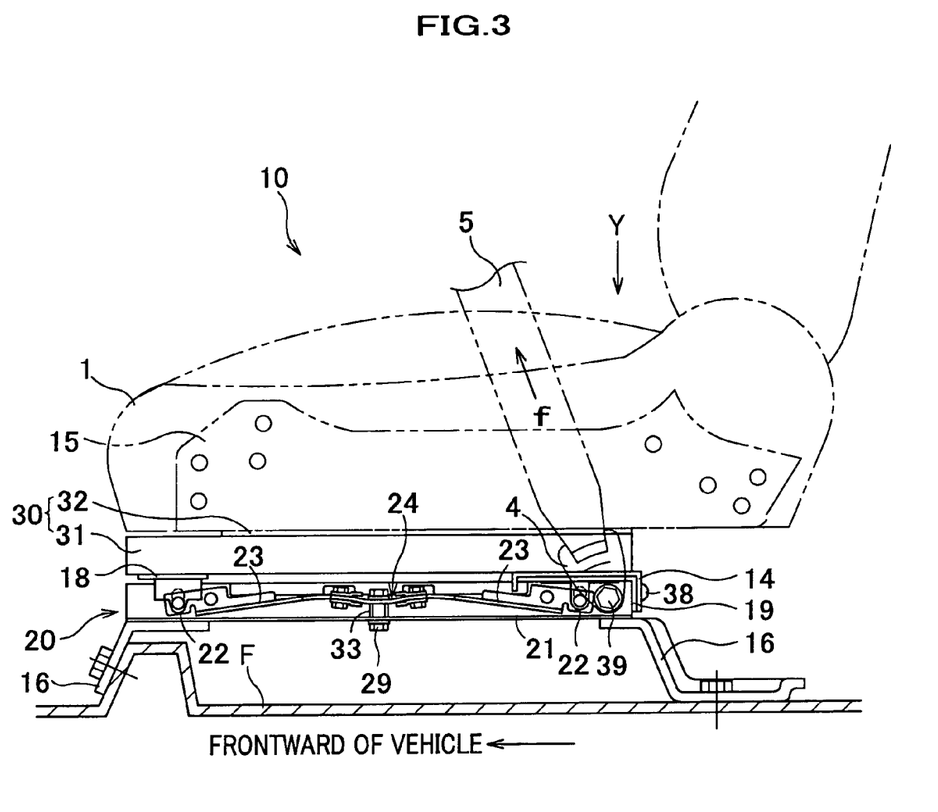
FIG. 3 is a section of the seat assembly shown in FIG. 1 as viewed from left-hand side of the vehicle.

As shown in FIG. 3, the seat assembly 10 includes, but not limited thereto, a seat 1 for receiving an occupant, a guide rail 31 for guiding a front/rear movement of the seat 1, a slider 32 fixed to the seat 1 and placed on and slidably engaging with the guide rail 31, a belt anchor bracket 14 provided under the guide rail 31, to which a belt anchor 4 is attached, a weight sensor 20 provide under the belt anchor bracket 14, and legs 16 for fixing the weight sensor 20 to the vehicle.

The weight sensor 20 is comprised of a box-shaped sensor housing 21, and a sensing mechanism housed in the sensor housing 21, for sensing weight variation of the seat 1, indicative of the status of the seat 1. A brief description will now be given of the sensing mechanism of the weight sensor 20. In the center of the bottom of the sensor housing 21 is provided a cylindrical center post 33, in which a bolt 29 is fitted and fixed securely. A sensor plate 24 having a plurality of strain gages arranged thereon is supported on the top of the center post 33 and secured with the bolt 29. An arm 23 extending to the right and to the left (toward rearward and frontward of the vehicle) is coupled with the sensor plate 24. The distal ends of the arm 23 are each bifurcated with its branches extending in parallel with each other and shaped like a letter U as viewed from its top. Provided in each of these parallel opposite tabular portions formed at each end of the arm 23 are two holes: a hole 23a and a pin hole 23b (see FIG. 6), through which a bracket pin 25 and a fulcrum pin 26 are inserted respectively. The fulcrum pin 26 provided between the center of the sensor plate 24 and bracket pin 25 is designed to allow the arm 23 to turn on the fulcrum pin 26 according to a vertical shift of the bracket pin 25.

Brackets 22, which will be described later, are provided around the U-shaped portions of the arm 23 at the front and rear ends thereof. A front load-receiving member 18 is fixed to the front bracket 22 to transmit a load received therein through the bracket pin 25 fitted in the front bracket 22, and the arm 23 to the sensor plate 24, while a rear load-receiving member 19 is fixed to the rear bracket 22 to transmit a load received therein through the bracket pin 25 fitted in the rear bracket 22, and the arm 23 to the sensor plate 24.

It is to be understood that FIG. 3 shows a state of the weight sensor 20 in which a load is applied through the load-receiving members 18, 19 and bracket pins 25 to the arm 23, deforming the arm 23 and the sensor plate 24.

Next, a description will be given of an exemplary construction of a lower, left-hand side and rear portion of the seat assembly 10 with a rear portion of the weight sensor 20 mounted therein, particularly of the geometry and arrangement of the belt anchor bracket 14, with reference to FIGS. 4 through 7.

Figure 4:
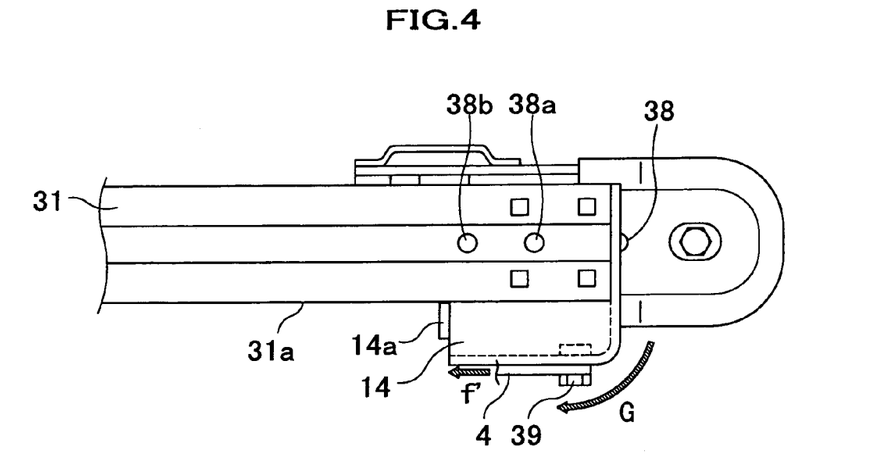
FIG. 4 is a partial plan view of the seat assembly, showing a rear portion of a weight sensor as viewed from arrow Y of FIG. 3.
Figure 5:
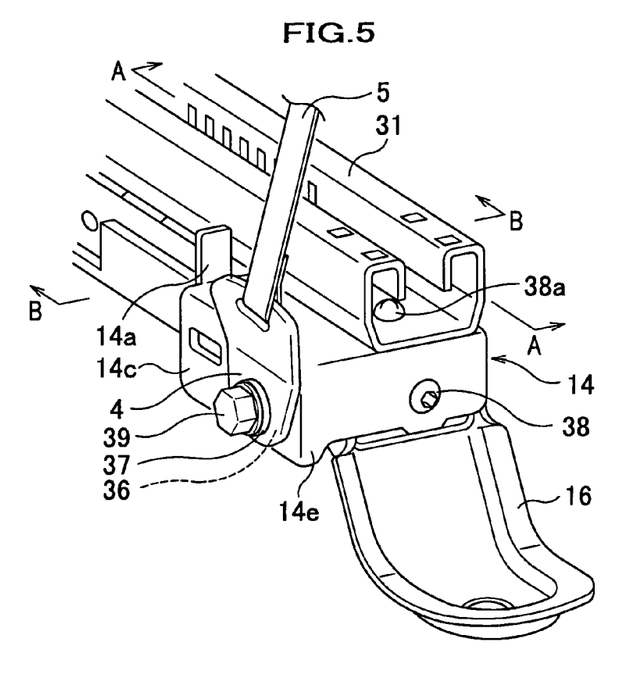
FIG. 5 is a partial perspective view of the seat assembly, showing the rear portion of the weight sensor shown in FIG. 4.
Figure 6:
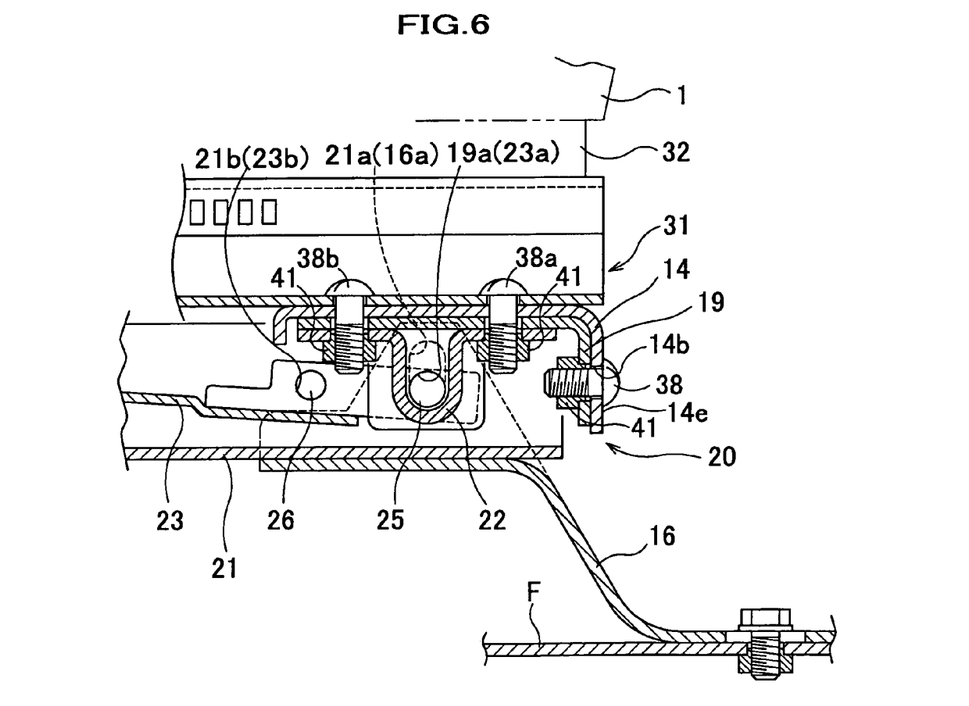
FIG. 6 is a longitudinal section taken along line A—A of FIG. 5 as viewed in the direction of the appended arrow.
Figure 7:
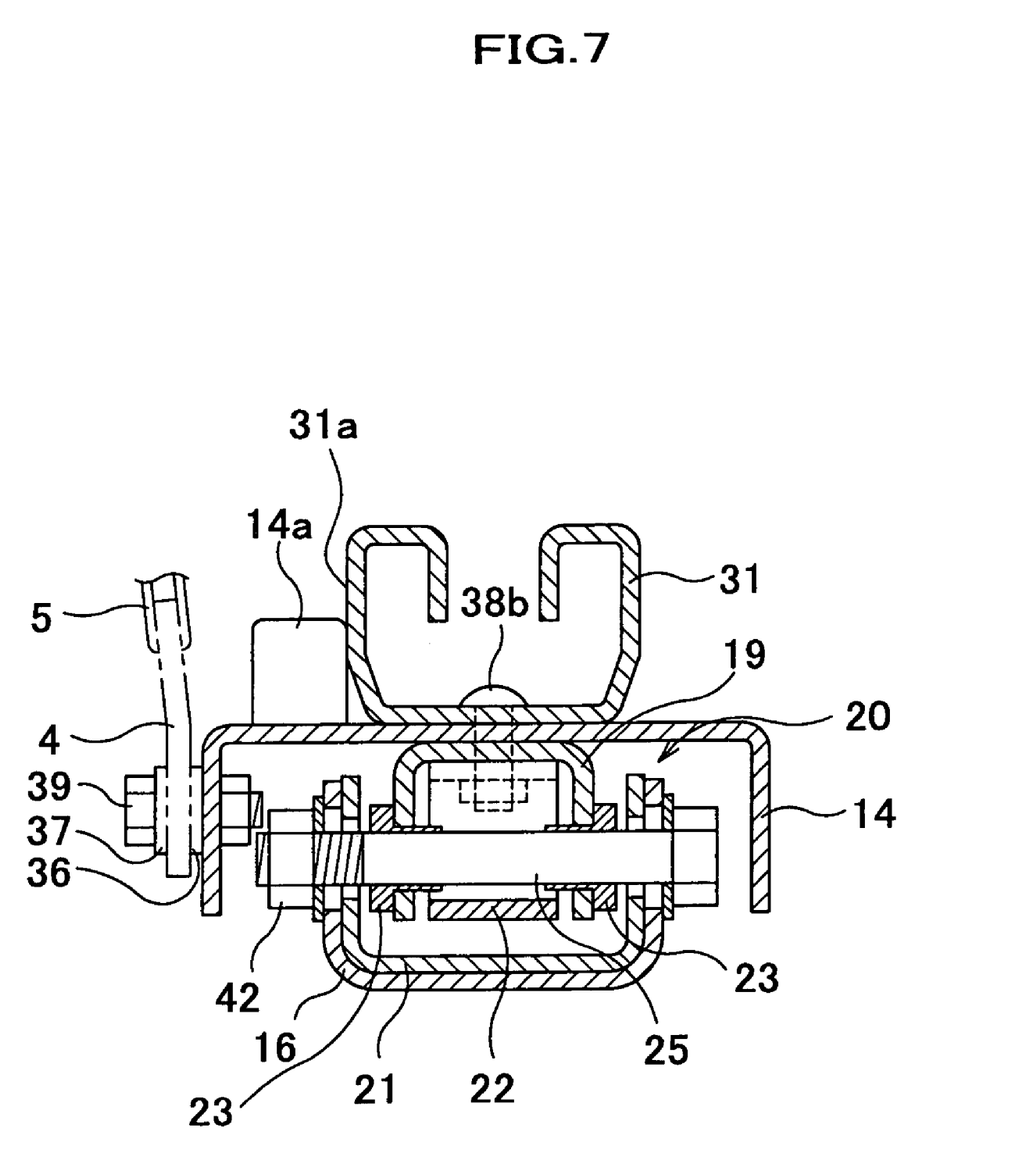
FIG. 7 is a longitudinal section taken along line B—B of FIG. 5 as viewed in the direction of the appended arrow.

First, referring to FIG. 5, the belt anchor bracket 14 outwardly looks like a generally rectangular parallelepiped when viewed from the rearward of the vehicle, but in actuality a front side thereof is partially open to allow the arm 23 to enter its inside as shown in FIG. 6, and a bottom thereof is open so as not to interfere with any other member provided underneath on the floor F except the load-receiving member 19 of the weight sensor 20 as shown in FIG. 7. The belt anchor bracket 14 is interposed between the rear load-receiving member 19 and the guide rail 31. A hole 14b is provided in a rear end plate 14e of the belt anchor bracket 14 (see FIG. 6), and the rear end plate 14e is fastened to the rear load-receiving member 19 with a bolt 38 fitted in the hole 14b and fixed with a nut 41 together with the rear load-receiving member 19 (see FIGS. 4–6). Hereupon, the rear end plate 14e is a vertical plate portion provided at the rear end of the belt anchor bracket 14, and the rear load-receiving member 19 is shaped to include a vertical plate portion corresponding to the rear end plate 14e of the belt anchor bracket 14, which is provided at the rear end of the rear load-receiving member 19. These vertical plate portions are placed to overlap each other, and fastened together with the bolt 38 for reinforcement. The guide rail 31, belt anchor bracket 14, rear load-receiving member 19 and bracket 22 are layered in this order from top to bottom, and fastened together with bolts 38a, 38b pierced therethrough and nuts 41, as shown in FIG. 6. Although the bolts 38, 38a and 38b are used as an example of fastening in the present embodiment, any other fastenings known in the art may be used instead, which includes, but not limited thereto, a rivet, welding, etc.

As shown in FIGS. 4, 5 and 7, a rotation prevention piece 14a is provided in the belt anchor bracket 14. The rotation prevention piece 14a is a projection attached at a rear end of a top face of the belt anchor bracket 14, which projection projects upward along a side 31a of the guide rail 31 facing a side plate 14c of the belt anchor bracket 14 at which the seat belt anchor 4 is attached (NB: the side plate 14c will hereinafter be referred to as "belt anchor attachment plate 14c"). To be more specific, the rotation prevention piece 14a may include, but not limited thereto, a rectangular plate that projects vertically from a horizontal face of the belt anchor bracket 14 with a side edge thereof perpendicularly abutted with the side 31a of the guide rail 31 as illustrated.

The functions of the rotation prevention piece 14a are numerous, and some examples thereof will be described below in detail. If the brake is applied when the vehicle is being driven, an occupant in the seat 1 then tends to move forward by an inertial force, with the result that the lap belt 5 is placed under a tension f as shown in FIG. 3. As a result, a tension f', which is a component of the tension f, is applied to the seat belt anchor 4 attached to the belt anchor bracket 14, and thus a torque G acts on the belt anchor bracket 14 and the bolts 38, 38a, 38b, as shown in FIG. 4. However, even if a large tension f takes place in the lap belt 5 and producing a torque G acting on the belt anchor bracket 14, the rotation prevention piece 14a abutted with the side 31a of the guide rail 31 can prevent the belt anchor bracket 14 from turning around. In other words, the rotation prevention piece 14a serves as reinforcement of the fastening (e.g., bolts 38, 38a, 38b and nuts 41) between the belt anchor bracket 14 and the guide rail 31 (and between the belt anchor bracket 14 and the rear load-receiving member 19) for preventing fracture or destruction of its joint structure due to the pulling force of the lap belt 5.

The seat belt anchor 4 is attached to the seat belt anchor attachment plate 14c of the belt anchor bracket 14 with a bolt 39, by placing a spacer 36, the seat belt anchor 4 and a washer 37 in this sequence on the outside surface of the seat belt anchor attachment plate 14c, and then fitting the bolt 39 through these components, as shown in FIGS. 5 and 7. Referring back to FIGS. 1 and 2, the buckle 17 in which the tongue 9 is latched is attached to the belt anchor bracket 14 provided at the inner (right) side of the seat 1, so that an adequate tension is provided to the lap belt 5 and the shoulder belt 7. The attachment of the buckle 17 to the belt anchor bracket 14 may, preferably but not necessarily, be carried out in the same manner as described above with respect to the attachment of the seat belt anchor 4 to the belt anchor bracket 14. The geometry and arrangement of the belt anchor bracket 14 to which the buckle 17 is attached may, preferably but not necessarily, be designed to be similar to those of the counterpart belt anchor bracket 14 to which the belt anchor 4 is attached, and may, more preferably but not necessarily, be designed to be symmetrical to those of the counterpart belt anchor bracket 14 with respect to the hypothetical vertical plane passing through the widthwise middle axis of the seat 1.

Accordingly, the weight sensor 20 does not output a wrong signal due to the tension of the lap belt 5 because the belt anchor bracket 14 to which the seat belt anchor 4 is attached is held and fixed between the load-receiving member 19 of the weight sensor 20 and the guide rail 31. In other words, the seat assembly 10 comprised of seat 1, guide rail (a pair of rails) 31, slider (a pair of sliders) 32 and a pair of belt anchor brackets 14 is weighed by the weight sensors 20, and thus the status of the seat can be accurately determined without suffering detrimental effects on the weight detection results due to the tension of the seat belt (lap belt 5).

Returning to FIG. 6, the bracket 22 is formed of a plate shaped substantially like a letter Ω in cross section as viewed from a side of the vehicle, and the bracket pin 25 is inserted therein so that the bracket pin 25 is prevented from coming off. The bracket 22 is fastened on the underside of the rear load-receiving member 19 with bolts 38a, 38b.

The rear load-receiving member 19 is formed of a plate shaped substantially like a letter L in cross section as viewed from a side of the vehicle (see FIG. 6), and placed in abutment with the belt anchor bracket 14. A vertically extending plate of the rear load-receiving member 19 facing to the rear of the vehicle is abutted with the rear end plate 14e, and fastened with a bolt 38 for reinforcement. The rear load-receiving member 19 is shaped like an inverted letter U in cross section as viewed from the rear of the vehicle, as shown in FIG. 7. The rear load-receiving member 19 is provided with two holes 19a each in the same position on its opposed vertically extending side plates so that the bracket pin 25 is neatly fitted in the holes 19a in a rotatable and longitudinally slidable manner.

The sensor housing 21 is formed of a plate shaped substantially like a letter U in cross section as viewed from the rear of the vehicle (see FIG. 7), to encase those components of the weight sensor 20. An upper portion of the leg 16 is formed of a plate shaped substantially like a letter U in cross section similar to the sensor housing 21 and provided so as to partially cover the outer surface of a rear end portion of the sensor housing 21, as shown in FIGS. 6 and 7. The rear portion of the weight sensor 20 is thus supported and fixed in position over the floor F of the vehicle with the leg 16. The sensor housing 21 is provided with two vertically oblong holes 21a each in the same position on its opposed vertically extending side plates so that the bracket pin 25 pierced through the holes 19a and 23a can be shifted vertically in the holes 21a according to changes in weight of the seat received by the load-receiving member 19. Similarly, the leg 16 is provided with two vertically oblong holes 16a so that the bracket pin 25 does not interfere with the vertically shiftable bracket pin 25.

The bracket pin 25, which is a hexagonal head bolt, has a hexagonal head formed at one end and a thread formed on the periphery of a shaft portion partway from the other end, but a midsection of the shaft portion has no thread formed on the periphery and serves as a pin, as shown in FIG. 7. The bracket pin 25 inserted through the oblong hole 16a of the leg 16, the oblong hole 21a of the sensor housing 21, the hole 23a of the arm 23, and the hole 19a of the rear load-receiving member 19, passing through the bracket 22, is then pierced through the hole 19a, hole 23a, oblong hole 21a, and oblong hole 16a, and fastened with a nut 41.

Accordingly, as shown in FIG. 3, a load of the occupant in the seat 1 is transmitted from the front load-receiving members 18 provided on the front portions of the weight sensors 20 through the brackets 22 or bracket pins 25 and from the rear load-receiving members 19 provided on the rear portions of the weight sensors 20 through the brackets 22 or bracket pins 25, and to the arms 23 and then to sensor plates 24, in which the weight of the seat assembly 10 which reflects the status of the seat 1 is measured. The load applied to the weight sensors 20 transmitted through the bolts 29 and fulcrum pins 26 to the sensor housings 21 which are supported on the legs 16.

It is contemplated that numerous modifications may be made to the exemplary embodiments of the invention without departing from the spirit and scope of the embodiments of the present invention as defined in the following claims.

For example, the guide rail 31, the belt anchor bracket 14, and the rear load-receiving member 19 and bracket 22 of the weight sensor 20 are placed to overlap each other and fastened together with bolts 38a, 39b in the above exemplary embodiment, but any other component may be interposed between them as long as such additionally interposed component is not connected to another element in the cabin of the vehicle in such a manner as to affect the sensing functionality of the weight sensor 20.

What is claimed is:

1. A vehicle seat assembly provided with a weight sensor, the seat assembly comprising:
   a seat for receiving an occupant;
   a guide rail for guiding a front/rear movement of the seat;
   a slider fixed to the seat, and placed on and slidably engaging with the guide rail; and
   a pair of belt anchor brackets for anchoring each end of a lap belt at each side of the seat, each belt anchor bracket provided under the guide rail and each belt anchor bracket fastened with at least one fastening pierced through the weight sensor, the belt anchor bracket, and the guide rail, wherein the weight sensor measures the weight of the seat assembly to determine status of the seat.

2. A seat assembly for a vehicle comprising:
   a seat for receiving an occupant;
   a guide rail for guiding a front/rear movement of the seat;
   a slider fixed to the seat, and placed on and slidably engaging with the guide rail;
   a pair of belt anchor brackets for anchoring each end of a lap belt at each side of the seat, each belt anchor bracket provided under the guide rail and each belt anchor bracket fastened with at least one fastening pierced through a weight sensor, the belt anchor bracket, and the guide rail;
   the weight sensor provided under the belt anchor brackets, for sensing weight variation of the seat; and
   a leg for fixing the weight sensor to the vehicle.

3. A vehicle seat assembly according to claim 1, wherein each belt anchor bracket is held and fixed by and between the weight sensor and the guide rail.

4. A vehicle seat assembly according to claim 3,
   wherein the belt anchor bracket comprises a projection projecting along at and laterally abutting one side of the guide rail.

5. A vehicle seat assembly according to claim 4, wherein the projection is provided along a side of the guide rail facing a portion at which a belt anchor is attached.

6. A vehicle seat assembly according to claim 4, wherein the projection comprises a plate that projects vertically from a horizontal face of the belt anchor bracket with a side edge thereof perpendicularly abutted with the side of the guide rail.

7. A vehicle seat assembly according to claim 3,
   wherein the belt anchor bracket and the weight sensor each comprise a vertical plate portion at a rear end portion thereof, said vertical plate portions being placed to overlap each other, and fastened together with at least one fastening pierced therethrough.

8. A vehicle seat assembly according to claim 3,
   wherein the belt anchor bracket comprises means for reinforcing the fastening between the belt anchor bracket and the guide rail against a pulling force of a lap belt.

9. A vehicle seat assembly according to claim 3,
   wherein the belt anchor bracket comprises means for preventing rotation of the belt anchor bracket due to a pulling force of a lap belt.

10. A vehicle seat assembly according to claim 1, further comprising
    a bracket that is formed of a plate shaped substantially like a letter omega in cross section as viewed from a side of the vehicle, is fastened underneath the belt anchor bracket, wherein said bracket is adapted to receive a bracket pin of the weight sensor.

11. A vehicle seat assembly according to claim 1, wherein the guide rail, the belt anchor bracket, a rear load-receiving member, and the bracket are layered in this order from top to bottom and fastened together.

12. A vehicle seat assembly according to claim 1, wherein the belt anchor bracket has side walls that extend down so as to cover lateral walls of the weight sensor.

13. A vehicle seat assembly provided with a weight sensor, the seat assembly comprising:
    a seat for receiving an occupant;
    a guide rail for guiding a front/rear movement of the seat;
    a slider fixed to the seat, and placed on and slidably engaging with the guide rail; and
    a pair of belt anchor brackets for anchoring each end of a lap belt at each side of the seat, each belt anchor bracket provided under the guide rail and each belt anchor bracket fastened with at least one fastening pierced through the weight sensor, the belt anchor bracket, and the guide rail, wherein the weight sensor measures the weight of the seat assembly to determine status of the seat, and wherein the belt anchor bracket further comprises a projection that projects vertically from a horizontal face of the belt anchor bracket with a side edge thereof perpendicularly abutted with a side of the guide rail to prevent the belt anchor bracket from turning around due to a torque from tension in the lap belt.

14. A vehicle seat assembly provided with a weight sensor, the seat assembly comprising:
    a seat for receiving an occupant;
    a guide rail for guiding a front/rear movement of the seat;
    a slider fixed to the seat, and placed on and slidably engaging with the guide rail; and
    a pair of belt anchor brackets for anchoring each end of a lap belt at each side of the seat, each belt anchor bracket provided under the guide rail, wherein the weight sensor measures the weight of the seat assembly to determine status of the seat, and wherein the belt anchor bracket further comprises a projection projecting along and laterally abutting one side of the guide rail.

* * * * *